United States Patent
Gu et al.

(10) Patent No.: US 10,011,493 B2
(45) Date of Patent: Jul. 3, 2018

(54) METHODS FOR PURIFYING HALOSILANE-CONTAINING STREAMS

(71) Applicant: MEMC Electronic Materials, Inc., St. Peters, MO (US)

(72) Inventors: Zhihui Gu, Houston, TX (US); Gianluca Pazzaglia, Merano (IT); Puneet Gupta, Houston, TX (US)

(73) Assignee: CORNER STAR LIMITED, Hong Kong (HK)

( * ) Notice: Subject to any disclaimer, the term of this patent is extended or adjusted under 35 U.S.C. 154(b) by 327 days.

(21) Appl. No.: 13/836,018

(22) Filed: Mar. 15, 2013

(65) Prior Publication Data

US 2013/0284585 A1   Oct. 31, 2013

Related U.S. Application Data

(60) Provisional application No. 61/639,641, filed on Apr. 27, 2012.

(51) Int. Cl.
*C01B 33/107* (2006.01)

(52) U.S. Cl.
CPC ...... *C01B 33/10778* (2013.01); *C01B 33/107* (2013.01)

(58) Field of Classification Search
CPC ............ C01B 33/107–33/10794; C10L 9/083
See application file for complete search history.

(56) References Cited

U.S. PATENT DOCUMENTS

| | | | | |
|---|---|---|---|---|
| 3,067,229 A * | 12/1962 | Fekete | ........................... | 556/405 |
| 3,069,239 A | 12/1962 | Winter et al. | | |
| 3,156,630 A * | 11/1964 | Fahnoe et al. | .................... | 203/4 |
| 3,188,168 A | 6/1965 | Bradley | | |
| 3,188,318 A | 6/1965 | Mack | | |
| 3,252,752 A * | 5/1966 | Pohl et al. | .................... | 423/342 |
| 4,099,936 A | 7/1978 | Tarancon | | |
| 4,340,574 A | 7/1982 | Coleman | | |
| 4,409,195 A * | 10/1983 | Darnell et al. | ................ | 423/342 |
| 4,481,178 A | 11/1984 | Kray | | |
| 5,232,602 A | 8/1993 | Brink et al. | | |
| 6,887,448 B2 | 5/2005 | Block et al. | | |
| 7,879,198 B2 * | 2/2011 | Ghetti | .............. | C01B 33/10794 203/29 |
| 2008/0314728 A1 | 12/2008 | Ghetti | | |
| 2011/0114469 A1 * | 5/2011 | Ghetti | ............................ | 203/51 |

FOREIGN PATENT DOCUMENTS

| | | |
|---|---|---|
| GB | 975000 A | 11/1964 |
| GB | 1241108 A | 7/1971 |

OTHER PUBLICATIONS

Tham, M.T., "Distillation: An introduction—Column Internals", R.C. Costello and Associates, Feb. 1, 2001 (date obtained from Google search Tools). Available online at http://www.rccostello.com/distil/distilint.htm.*
chem.purdue.edu. "What is a Coordination Compound", Purdue Department of Chemistry. Available online at http://www.chem.purdue.edu/jmol/cchem/.*
Aprilia, Jaya, "Distillation Column Selection and Sizing (Engineering Design Guidelines)", Feb. 2011, KLM Technology Group, Rev 3.*
Huang, G. et al., Distillation Process for the Purification of Trichlorosilane, Paper, Oct. 10, 2010, AIChE.
PCT International Search Report and Written Opinion of the International Searching Authority dated Jul. 23, 2013 regarding PCT/US2013/036972 filed on Apr. 17, 2013; 10 pages.
Shaw, R. A. et al., "Halogen Bonding with Phosphine: Evidence for Mulliken Inner Complexes and the Importance of Relaxation Energy", J. Phys. Chem. A, 120 (42) (2016), Abstract.

* cited by examiner

*Primary Examiner* — Jonathan Miller
*Assistant Examiner* — Jonathan Luke Pilcher
(74) *Attorney, Agent, or Firm* — Armstrong Teasdale LLP

(57) ABSTRACT

Methods for purifying a halosilane-containing process stream include a process stream purified by removing arsenic and phosphorous impurities by use of distillation.

19 Claims, No Drawings

METHODS FOR PURIFYING HALOSILANE-CONTAINING STREAMS

CROSS REFERENCE

This application claims priority to U.S. Provisional Application No. 61/639,641 filed Apr. 27, 2012, the disclosure of which is hereby incorporated by reference in its entirety.

FIELD OF THE DISCLOSURE

The field of the disclosure relates to purification of halosilane-containing process streams. In particular embodiments, arsenic and phosphorous impurities are removed from a halosilane-containing process stream by distillation.

BACKGROUND

Halosilanes such as trichlorosilane and tetrachlorosilane are versatile compounds that are useful in a variety of applications such as for production of polycrystalline silicon. Polycrystalline silicon is a vital raw material used to produce many commercial products including, for example, integrated circuits and photovoltaic (i.e., solar) cells. Polycrystalline silicon is often produced by a chemical vapor deposition mechanism in which silicon is deposited from silane or a halosilane onto silicon particles in a fluidized bed reactor or onto silicon rods as in a Siemens-type reactor. The seed particles continuously grow in size until they exit the reactor as polycrystalline silicon product (i.e., "granular" polycrystalline silicon).

To produce electronic grade polycrystalline silicon which is used in semiconductor and solar industries, the silane or halosilane deposition gases must be relatively free of contaminants often found in such gases such as arsenic and phosphorous impurities. Conventional methods for removing such impurities involve additives that are used to complex phosphorous and/or arsenic followed by removal of the complexed compounds. It has been reported that the compounds may be removed by distillation in a column with a relatively high reflux ratio and/or a relatively high number of theoretical stages (or even by use of two columns operated in series), which causes the distillation operation to not be cost effective relative to other methods.

A continuing need exists for methods for purifying halosilane process streams and, in particular, for methods that remove arsenic and phosphorous from such process streams.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a method for purifying a halosilane-containing stream. The halosilane-containing stream contains a halosilane, arsenic and phosphorous. The halosilane-containing stream is introduced into a distillation column to produce an overhead fraction. The overhead fraction contains halosilane and is depleted in arsenic relative to the halosilane-containing stream and is depleted in phosphorous relative to the halosilane-containing stream. The distillation column operates with a reflux ratio of about 50 or less.

Another aspect of the present disclosure is directed to a method for purifying a halosilane-containing stream. The halosilane-containing stream contains a halosilane, non-complexed arsenic and non-complexed phosphorus. The halosilane-containing stream is introduced into a distillation column to produce an overhead fraction. The overhead fraction contains halosilane and less than about 20% of the arsenic introduced into the distillation column in the halosilane-containing stream and less than about 20% of the phosphorous introduced into the distillation column in the halosilane-containing stream.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

DETAILED DESCRIPTION

In accordance with embodiments of the present disclosure, a halosilane-containing stream is introduced into a distillation column which is operated under conditions that allow the column to operate with relatively low reflux ratios and with a relatively low number of stages (or theoretical stages such as in the case of packed columns and/or a reduced number of plates as with plated distillation columns). In some embodiments, the process streams are made relatively pure by use of one distillation column rather than by use of two or more columns connected in series.

The halosilane-containing streams which are subjected to downstream purification by distillation according to embodiments of the present disclosure contain a halosilane such as monohalosilane, dihalosilane, trihalosilane, or tetrahalosilane. In some embodiments the halosilane is selected from trihalosilane and tetrahalosilane. The halogen may be selected from the list of chlorine, bromide, and iodine. The halogen may be chlorine and, in particular embodiments, the halosilane may be chosen from trichlorosilane and tetrachlorosilane. Typically the process stream will contain one halosilane as its principal component (with other halosilanes possibly being present in minor amounts such as less than 2 wt %). However, the present disclosure also includes embodiments wherein the process stream that is purified contains two or more halosilanes (e.g., at least 2 wt % of each halosilane).

In particular embodiments, the halosilane-containing gas comprises trichlorosilane (such as at least about 50 wt %, at least about 80 wt %, at least about 90 wt %, or at least about 95 wt % trichlorosilane with the remainder being impurities) and, in other embodiments, comprises tetrachlorosilane (such as at least about 50 wt %, at least about 80 wt %, at least about 90 wt %, or at least about 95 wt % tetrachlorosilane with the remainder being impurities).

In some embodiments, the halosilane-containing stream that is purified downstream contains less than about 100 ppbw impurities (e.g., compounds other than halosilanes), less than about 50 ppbw, less than about 25 ppbw, or less than about 10 ppbw impurities (e.g., from about 1 ppbw to about 100 ppbw, from about 1 ppbw to about 50 ppbw, or from about 1 ppbw to about 10 ppbw impurities). Impurities that may be present in the halosilane-containing stream include, for example, boron, aluminum, iron, carbon, phosphorous, and arsenic. The halosilane-containing stream may have been subjected to one or more upstream purification processes (e.g., column distillation) prior to the purification process described herein. For example, boron may have been previously removed from the halosilane-containing stream by use of other distillation columns, including reactive distillation or adsorption processes.

The halosilane-containing stream that is introduced into the distillation column, as described below, may contain at least about 1 ppbw arsenic-containing compounds, at least about 10 ppbw, at least about 50 ppbw, or even at least about 75 ppbw arsenic-containing compounds (e.g., from about 1 ppbw to about 100 ppbw or from about 1 ppbw to about 50 ppbw arsenic-containing compounds). It should be noted that, as used herein, use of "parts per million volume" (ppmw) or "parts per billion volume" (ppbw) is not intended to imply that the process stream is a liquid. For instance, the halosilane-containing stream introduced into the distillation column may be a gas stream. Arsenic compounds that may be present in the halosilane-containing stream include, for example, $AsX_3$, $AsHX_2$, and $AsH_2X$, wherein X is a halogen such as chlorine.

Alternatively or in addition to arsenic, the halosilane-containing stream may include phosphorous impurities. The halosilane-containing stream may contain at least about 1 ppbw phosphorous-containing compounds or, as in other embodiments, at least about 10 ppbw, at least about 50 ppbw or even at least about 75 ppbw phosphorous-containing compounds (e.g., from about 1 ppbw to about 100 ppbw or from about 1 ppbw to about 50 ppbw phosphorous-containing compounds). Phosphorous compounds that may be present in the halosilane-containing stream include, for example, $PX_3$, $PHX_2$, and $PH_2X$, wherein X is a halogen such as chlorine.

The halosilane-containing stream may contain arsenic and phosphorous that is not complexed (e.g., by addition of a complexing agent). Stated otherwise, an amount (e.g., at least about 50%, at least about 75%, at least about 90%, or at least about 99%) of the phosphorous and arsenic are present as $AsX_3$, $AsHX_2$, and $AsH_2X$; $PX_3$, $PHX_2$, and $PH_2X$; or as other simple compounds (e.g., having 5 or less atoms).

The halosilane-containing stream may be introduced into the distillation column as a liquid and, in some embodiments, is condensed prior to entry into the distillation column. The pressure of the halosilane-containing process stream introduced into the distillation column may be at least about 2 bar or, as in other embodiments, from about 2 bar to about 10 bar. Alternatively or in addition, the temperature of the feed may be from about 5° C.; to about 60° C., from about 5° C. to about 50° C. or from about 20° C. to about 30° C. In some embodiments, the halosilane-containing stream is introduced into the column as a gas. It is preferred that the halosilane-containing stream be introduced into the column below the middle stage. However, the halosilane-containing stream may also be introduced at (or near) the middle stage or above the middle stage without departing from the scope of the present disclosure.

In accordance with embodiments of the present disclosure, the halosilane-containing stream is introduced into a distillation column to produce an overhead fraction that is depleted in arsenic and phosphorous and a bottoms fraction that is enriched in arsenic and phosphorous. The overhead fraction may be recovered as a purified product stream that may be used, for example, to produce polycrystalline silicon. In embodiments in which the overhead fraction contains tetrachlorosilane, the overhead fraction may be converted to trichlorosilane (e.g., by hydrogenation of tetrachlorosilane in a thermal process). The resulting trichlorosilane may be used for the production of polycrystalline silicon or for other uses (e.g., epitaxial silicon layer deposition). The bottoms fraction (or a portion thereof) may be disposed of as waste or may be recycled to other streams and/or operating units (e.g., various upstream reactors such as a hydrochlorination reactor when part of a polycrystalline production plant and/or recycled to upstream crude purification columns).

Operation of the distillation column may be controlled by regulating the pressure and/or temperature of the overhead fraction. In some embodiments, the column is operated under pressure to avoid introduction of oxygen and various contaminants into the column. In these embodiments, the overhead fraction may have a pressure of at least about 1.5 bar (e.g., from about 1.5 bar to about 7 bar or from about 1.5 bar to about 4 bar). The temperature of the overhead fraction may be at or near the saturation temperature of the corresponding pressure. In some embodiments, the temperature of the overhead fraction is from about 70° C. to about 135° C., from about 70° C. to about 100° C., or from about 70° C. to about 80° C.

It should be noted that the feed pressures and temperatures and the overhead fraction temperatures and pressure are exemplary and other temperatures and pressures may be used without departing from the scope of the present disclosure.

The distillation column can be a packed bed or may have plates as described below. When a packed column is used, the column may be packed with any packing material available to those of skill in the art suitable for use in distilling halosilane-containing streams at pressures and temperatures described herein. In some embodiments, structured packing may be used such as Flexipac 2Y HC packing (Koch-Glitsch, Wichita, Kans.). In other embodiments random packing is used. In these embodiments, rings, ribbons, saddles, and the like may be used. In this regard, while packed bed columns do not have discreet stages for contacting gas and liquid phases, the column may be characterized by a number of theoretical stages and a height equivalent of a theoretical stage (HETS.). For distillation of halosilanes, the height equivalent of a theoretical stage may be between about 0.25 meters and about 0.75 meters, and for embodiments that use a packed column, the height may depend and/or be determined from the type of packing material used is the column.

In other embodiments, the distillation column contains plates rather than packing. The number of theoretical stages in the column (or in the packed bed described above) may be less than conventional distillation. In some embodiments, the number of theoretical stages (for either packed or plated columns) is less than about 100 theoretical stages or, as in other embodiments, less than about 90 theoretical stages, less than about 80 theoretical stages, less than about 70 theoretical stages, less than about 60 theoretical stages, from about 15 theoretical stages to about 100 theoretical stages, from about 15 theoretical stages to about 90 theoretical stages, from about 15 theoretical stages to about 80 theoretical stages, from about 30 theoretical stages to about 80 theoretical stages, or from about 40 theoretical stages to about 80 theoretical stages. In embodiments having a plated column, the number of plates is greater than the number of theoretical stages due to the gas and liquid not fully reaching equilibrium at each plate. The number of actual plates used in plated columns may be less than about 100 plates, less than about 90 plates, less than about 80 plates, less than about 70 plates, less than about 60 plates, from about 15 plates to about 100 plates, from about 15 plates to about 90 plates, from about 15 plates to about 80 plates, from about 30 plates to about 80 plates, or from about 40 plates to about 80 plates.

As stated above, the distillation column may also be operated with a reduced reflux ratio relative to conventional processes. In some embodiments, the reflux ratio is about 50 or less or, as in other embodiments, about 30 or less, about 15 or less, about 11 or less, about 8 or less, about 6 or less, about 4 or less, from about 1.5 to about 50, from about 2 to about 50, from about 2 to about 30, from about 2 to about 15, or from about 3 to about 8.

The overhead fraction discharged from the distillation column is depleted in arsenic and phosphorous relative to the halosilane-containing stream introduced into the column. In some embodiments, the overhead fraction contains less than about 50% of the arsenic introduced into the distillation column in the halosilane-containing stream or, as in other embodiments, contains less than about 40%, less than about 30%, less than about 20%, less than about 10%, less than about 5%, less than about 1%, less than about 0.1%, from about 0% to about 50%, from about 0% to about 10%, from about 0% to about 1%, or from about 0% to about 0.1% of the arsenic introduced into the distillation column in the halosilane-containing stream. Alternatively or in addition, the overhead fraction may contain less than about 50% of the phosphorous introduced into the distillation column in the halosilane-containing stream or contains less than about 40%, less than about 30%, less than about 20%, less than about 10%, less than about 5%, less than about 1%, from about 0% to about 50%, from about 0% to about 10%, from about 0.1% to about 10%, from about 0% to about 1%, or from about 0.1% to about 1% of the phosphorous introduced into the distillation column in the halosilane-containing stream.

The amount of arsenic and phosphorous in the overhead fraction depends on the initial amount of arsenic and phosphorous in the halosilane-containing stream and the removal efficiency. In some embodiments, the overhead fraction contains less than about 50 ppbw arsenic-containing compounds or, as in other embodiments, less than about 25 ppbw, less than about 10 ppbw, less than about 5 ppbw, less than about 1 ppbw, from about 0 to about 50 ppbw, from about 0 to about 25 ppbw, from about 300 pptw (parts per trillion weight) to about 50 ppbw, or from about 300 pptw to about 10 ppbw arsenic-containing compounds.

Alternatively or in addition, the overhead fraction may contain less than about 50 ppbw phosphorous-containing compounds or, as in other embodiments, less than about 25 ppbw, less than about 10 ppbw, less than about 5 ppbw, less than about 1 ppbw, from about 0 to about 50 ppbw, from about 0 to about 25 ppbw, from about 300 pptw to about 50 ppbw, or from about 300 pptw to about 10 ppbw phosphorous-containing compounds. It should be noted that amounts less than about 300 pptw may be considered to be about zero (0) as 300 pptw is about the detection limit of phosphorous and arsenic. In some embodiments, arsenic and/or phosphorous cannot be detected in the overhead fraction.

The bottoms fraction contains the remainder of the arsenic and phosphorous impurities and also contains an amount of halosilane. To allow more purified halosilane (i.e., the overheads fraction) to be used for downstream processing the amount of halosilane in the bottom fraction is kept relatively low. In some embodiments, the bottoms fraction contains less than about 15% of the halosilane introduced into the column in the halosilane-containing feed stream or, as in other embodiments, less than about 10% or less than about 7.5% of the halosilane introduced into the column in the halosilane-containing feed stream (e.g., from about 2% to about 15% or from about 2% to about 10% of the halosilane introduced into the column in the halosilane-containing feed stream).

EXAMPLES

The processes of the present disclosure are further illustrated by the following Examples. These Examples should not be viewed in a limiting sense.

Example 1: Simulated Removal of Arsenic and Phosphorous from a Tetrachlorosilane-Containing Steam in a Column with 70 Theoretical Stages Tetrachlorosilane (3,700 kg/hr) containing $PCl_3$ (1,223 ppbv) and $AsCl_3$ (927 ppbv) was fed to a distillation column with a diameter of 0.8 meters and a height of 26 meters in a simulation program (Aspen Plus). The simulated column was packed with Flexipac 2Y HC packing (Koch-Glitsch, Wichita, Kans.). The column height was equivalent to 70 theoretical stages (height of an equivalent stage being 0.37 meters). The column reflux ratio was 3.6. The flow rate of the overhead fraction was 3,500 kg/hr and the overhead fraction contained 9 ppbv $PCl_3$ and no $AsCl_3$. The flow rate of the bottom fraction was 200 kg/hr and the bottom fraction contained 22.7 ppmv $PCl_3$ and 17.3 ppmv $AsCl_3$. The pressure of the feed was 3.0 bar and the temperature was 25° C. The pressure of the overhead fraction was 2.0 bar and the temperature was 79° C. The pressure of the bottoms fraction was 2.2 bar and the temperature was 83° C. The column condenser duty was 1,978,442 kJ/hr and the reboiler duty was 2,706,503 kJ/hr.

Example 2: Simulated Removal of Arsenic and Phosphorous from a Tetrachlorosilane-Containing Stream in a Column with 52 Theoretical Stages Tetrachlorosilane (3,700 kg/hr) containing $PCl_3$ (1,223 ppbv) and $AsCl_3$ (927 ppbv) was fed to a distillation column with a diameter of 1.3 meters and a height of 19 meters in a simulation program (Aspen Plus). The simulated column was packed with Flexipac 2Y HC packing (Koch-Glitsch, Wichita, Kans.). The column height was equivalent to 52 theoretical stages (height of an equivalent stage being 0.37 meters). The column reflux ratio was 1.1. The flow rate of the overhead fraction was 3,500 kg/hr and the overhead fraction contained 10 ppbv $PCl_3$ and no $AsCl_3$. The flow rate of the bottom fraction was 200 kg/hr and the bottom fraction contained 22.7 ppmv $PCl_3$ and 17.3 ppmv $AsCl_3$. The pressure of the feed was 3.0 bar and the temperature was 25° C. The pressure of the overhead fraction was 2.0 bar and the temperature was 79° C. The pressure of the bottoms fraction was 2.2 bar and the temperature was 83° C. The column condenser duty was 6,045,482 kJ/hr and the reboiler duty was 6,773,457 kJ/hr.

Example 3: Removal of Phosphorous from a Halosilane-Containing Stream in a Column with 26 Theoretical Stages A halosilane-containing stream (containing 83.92 wt % tetrachlorosilane, 16.04 wt % trichlorosilane, 0.04 wt % dichlorosilane, and 14.99 ppbw phosphorous) was fed to a distillation column with a feed rate of 1000 kg/hr. The column had a diameter of 1.5 meters and a height of 17.31 meters. The column was packed with Mellapak Plus 752.Y structured packing (Sulzer Chemtech Ltd., Winterhur, Switzerland). The packing height was equivalent to 26 theoretical stages (height of an equivalent stage being 0.66 meters). The column overhead flow rate was 850 kg/hr (containing 80.86 wt % tetrachlorosilane, 19.10 wt % trichlorosilane, 0.05 wt % dichlorosilane) and contained less than 0.03 ppbw phosphorous. The column was operated at a reflux ratio of 20. The bottom flow rate was 150 kg/hr (containing 99.99 wt % tetrachlorosilane, less than 0.03 wt % trichlorosilane, and less than 0.03 wt % dichlorosilane) and contained 92.08 ppbw phosphorous. The column was operated at an overhead fraction pressure of 0.3 bar (gauge) and at an overhead fraction temperature of 63° C. The column bottom temperature was 69° C.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A method for purifying a halosilane-containing stream, the halosilane-containing stream comprising a halosilane, arsenic and phosphorous, the method comprising introducing the halosilane-containing stream into a distillation column to produce an overhead fraction containing halosilane and less than about 50% of the arsenic introduced into the distillation column in the halosilane-containing stream and less than about 50% of the phosphorous introduced into the distillation column in the halosilane-containing stream, the halosilane-containing stream not being contacted with a complexing agent prior to or during distillation and not being a product stream of a previous distillation column operation, the distillation column operating with a reflux ratio of about 50 or less, the distillation column including packing or plates, wherein when the distillation column includes packing, the distillation column includes less than about 100 theoretical stages, and when the distillation column includes plates, the distillation column includes less than about 100 plates.

2. The method of claim 1, wherein the distillation column includes packing, the distillation column having a height equivalent of a theoretical stage of between about 0.25 meters and about 0.75 meters.

3. The method of claim 1, wherein the distillation column includes packing, the packing being a structured packing.

4. The method of claim 1, wherein the distillation column operates at a reflux ratio of less than about 30.

5. The method of claim 1, wherein the overhead fraction contains less than about 50 ppbw arsenic-containing compounds.

6. The method of claim 1, wherein the overhead fraction contains less than about 50 ppbw phosphorous-containing compounds.

7. The method of claim 1, wherein the overhead fraction contains less than about 10% of the arsenic introduced into the distillation column in the halosilane-containing stream.

8. The method of claim 1, wherein the overhead fraction contains less than about 10% of the phosphorous introduced into the distillation column in the halosilane-containing stream.

9. The method of claim 1, wherein the halosilane-containing stream contains arsenic-containing compounds of about 1 ppbw or more.

10. The method of claim 1, wherein the halosilane-containing stream contains phosphorous-containing compounds of about 1 ppbw or more.

11. The method of claim 1, wherein the temperature of the overhead fraction is from about 70° C. to about 135° C.

12. The method of claim 1, wherein the pressure of the overhead fraction is about 1.5 bar or more.

13. The method of claim 1, wherein a bottoms fraction is produced from the distillation column, the bottoms fraction containing less than about 15% of the halosilane introduced into the column in the halosilane-containing stream.

14. The method of claim 1, wherein the halosilane-containing stream is a gas, the method further comprising the step of condensing the halosilane-containing stream prior to introduction into the distillation column.

15. The method of claim 1, wherein the halosilane-containing stream is a liquid.

16. The method of claim 1, wherein the halosilane contains a halogen selected from group consisting of chlorine, bromine and iodine.

17. The method as set forth in claim 1, wherein:
at least about 50% of the arsenic in the halosilane-containing stream prior to or during distillation is present as $AsX_3$, $AsHX_2$, and $AsH_2X$, or other arsenic compounds having 5 or less atoms, wherein X is a halogen; and
at least about 50% of the phosphorous in the halosilane-containing stream prior to or during distillation is present as $PX_3$, $PHX_2$, and $PH_2X$, or as other phosphorous compounds having 5 or less atoms.

18. The method as set forth in claim 1, wherein:
at least about 90% of the arsenic in the halosilane-containing stream prior to or during distillation is present as $AsX_3$, $AsHX_2$, and $AsH_2X$, or other arsenic compounds having 5 or less atoms, wherein X is a halogen; and
at least about 90% of the phosphorous in the halosilane-containing stream prior to or during distillation is present as $PX_3$, $PHX_2$, and $PH_2X$, or as other phosphorous compounds having 5 or less atoms.

19. The method as set forth in claim 1, wherein:
at least about 99% of the arsenic in the halosilane-containing stream prior to or during distillation is present as $AsX_3$, $AsHX_2$, and $AsH_2X$, or other arsenic compounds having 5 or less atoms, wherein X is a halogen; and
at least about 99% of the phosphorous in the halosilane-containing stream prior to or during distillation is present as $PX_3$, $PHX_2$, and $PH_2X$, or as other phosphorous compounds having 5 or less atoms.

* * * * *